(12) United States Patent
He (10) Patent No.: US 10,262,190 B2
(45) Date of Patent: Apr. 16, 2019

(54) METHOD, SYSTEM, AND COMPUTER PROGRAM PRODUCT FOR RECOGNIZING FACE

(71) Applicants: BEIJING KUANGSHI TECHNOLOGY CO., LTD., Beijing (CN); PINHOLE (BEIJING) TECHNOLOGY CO., LTD., Beijing (CN)

(72) Inventor: Tao He, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 296 days.

(21) Appl. No.: 14/888,360

(22) PCT Filed: Mar. 26, 2015

(86) PCT No.: PCT/CN2015/075140
§ 371 (c)(1),
(2) Date: Aug. 31, 2016

(87) PCT Pub. No.: WO2016/149944
PCT Pub. Date: Sep. 29, 2016

(65) Prior Publication Data
US 2016/0371537 A1 Dec. 22, 2016

(51) Int. Cl.
*G06K 9/00* (2006.01)
*G06K 9/46* (2006.01)
(Continued)

(52) U.S. Cl.
CPC ..... *G06K 9/00268* (2013.01); *G06K 9/00228* (2013.01); *G06K 9/00281* (2013.01);
(Continued)

(58) Field of Classification Search
CPC .......... G06K 9/00228; G06K 9/00268; G06K 9/00281; G06K 9/00288; G06K 9/4604;
(Continued)

(56) References Cited

U.S. PATENT DOCUMENTS

2013/0236052 A1 9/2013 Corcoran et al.
2013/0279826 A1* 10/2013 Chuang ................. G06T 3/4069
382/299

(Continued)

FOREIGN PATENT DOCUMENTS

CN 103093205 5/2013
CN 103984920 8/2014
(Continued)

OTHER PUBLICATIONS

First Office Action, issued in the corresponding Chinese patent application No. 201580000324.8, dated May 3, 2018, 26 pages.
(Continued)

*Primary Examiner* — Edward Park
(74) *Attorney, Agent, or Firm* — Hamre, Schumann, Mueller & Larson, P.C.

(57) ABSTRACT

A method, system and computer program product for recognizing a face are provided, comprising: acquiring an image for the face; detecting a set of first feature points representing detail features of the image; extracting, for each first feature point in the set of first feature points, a first descriptor describing feature information on the first feature point; acquiring, for each second feature point in a set of second feature points, a second descriptor describing feature information on the second feature point; detecting matched feature point pairs between the set of first feature points and the set of second feature points, based on the first descriptor and the second descriptor; calculating the number of the matched feature point pairs; and recognizing the image as
(Continued)

being consistent with the registered image, if the number of the matched feature point pairs is larger than a first preset threshold.

20 Claims, 2 Drawing Sheets

(51) Int. Cl.
*G06K 9/62* (2006.01)
*G06K 9/48* (2006.01)
(52) U.S. Cl.
CPC ....... *G06K 9/00288* (2013.01); *G06K 9/4604* (2013.01); *G06K 9/6202* (2013.01); *G06K 9/6256* (2013.01); *G06K 2009/488* (2013.01)
(58) Field of Classification Search
CPC ............... G06K 9/6202; G06K 9/6256; G06K 2009/488
See application file for complete search history.

(56) References Cited

U.S. PATENT DOCUMENTS

| | | | | |
|---|---|---|---|---|
| 2014/0044361 | A1* | 2/2014 | Lee | G06K 9/6211 |
| | | | | 382/201 |
| 2014/0050404 | A1* | 2/2014 | Solem | G06K 9/00281 |
| | | | | 382/190 |
| 2014/0147023 | A1* | 5/2014 | Lee | G06K 9/00288 |
| | | | | 382/118 |
| 2014/0254940 | A1* | 9/2014 | Shiiyama | G06K 9/4671 |
| | | | | 382/201 |
| 2015/0078629 | A1* | 3/2015 | Gottemukkula | G06K 9/0061 |
| | | | | 382/117 |
| 2015/0206029 | A1* | 7/2015 | Chikano | G06K 9/6211 |
| | | | | 382/201 |
| 2015/0379366 | A1* | 12/2015 | Nomura | G06Q 50/28 |
| | | | | 382/203 |
| 2016/0150211 | A1* | 5/2016 | Hwang | G06T 3/0093 |
| | | | | 348/43 |
| 2016/0371537 | A1* | 12/2016 | He | G06K 9/00281 |

FOREIGN PATENT DOCUMENTS

| | | |
|---|---|---|
| CN | 103988228 | 8/2014 |
| CN | 104182974 | 12/2014 |
| CN | 104200461 | 12/2014 |
| CN | 104240231 | 12/2014 |
| CN | 104318259 | 1/2015 |
| JP | 2000088554 | 3/2000 |

OTHER PUBLICATIONS

International Search Report and Written Opinion issued in the corresponding International application No. PCT/CN2015/075140, dated Jan. 5, 2016, 18 pages.

* cited by examiner

METHOD, SYSTEM, AND COMPUTER PROGRAM PRODUCT FOR RECOGNIZING FACE

TECHNICAL FIELD

The present disclosure relates to the field of face recognition technology, and particularly to a method, a system and a computer program product for recognizing a face.

BACKGROUND

With several years of development, the face recognition has got wide attention, and has made great progress. Nowadays, the face recognition technology has been widely applied in fields such as the national security, the military security, the public security, or the like, and is used, for example, for the smart video monitoring, the smart access control, the custom identification verification, or the like. In recent years, the face recognition is also widely applied in fields such as Internet, finance, or the like, and is used, for example, to open a credit card account or a stock account online, to verify identification, or the like.

Currently, most face recognition methods are based on a face image with a low resolution, and only structure information on the face is used. In the traditional face recognition, generally, an image with a low resolution (generally, the distance between both eyes of the face being larger than 30 pixels) is sufficient for the recognition. In this way, only global structure information on the face may be obtained, and most detail features of the face are lost, resulting in a relatively low accuracy of the face recognition.

SUMMARY

The present disclosure is made in view of the above. A method, a system and a computer program product for recognizing a face are provided in embodiments of the present disclosure, in which the face recognition can be performed by using detail features of the face, thereby, very familiar faces including faces of identical twins can be distinguished, the accuracy of the face recognition is greatly improved, and the security of the scenario in which the face recognition is applied is improved accordingly.

According to an aspect of the present disclosure, a method for recognizing a face is provided, comprising: acquiring an image to be recognized, for the face; detecting a set of first feature points representing detail features of the image to be recognized, in the image to be recognized; extracting, for each first feature point in the set of first feature points, a first descriptor describing feature information on the first feature point; acquiring, for each second feature point in a set of second feature points, a second descriptor describing feature information on the second feature point, the set of second feature points representing detail features of a pre-stored registered image; detecting matched feature point pairs between the set of first feature points and the set of second feature points, based on the first descriptor and the second descriptor; calculating the number of the matched feature point pairs; and recognizing the image to be recognized as being consistent with the registered image, if the number of the matched feature point pairs is larger than a first preset threshold.

As an example, in the method according to the embodiment of the present disclosure, a resolution of the image is larger than a preset resolution threshold.

As an example, the method according to the embodiment of the present disclosure further comprises: detecting a face region image in the image to be recognized; wherein, the step of detecting the set of first feature points representing detail features of the image to be recognized in the image to be recognized comprises: detecting the set of first feature points based on the face region image.

As an example, in the method according to the embodiment of the present disclosure, the step of detecting the set of first feature points comprises: scaling the face region image into different scales; and detecting a location and a size of the first feature point using an off-line trained feature point classifier, for the face region image in each scale.

As an example, in the method according to the embodiment of the present disclosure, the step of detecting the set of first feature points comprises: performing a convolution process on the face region image with Gaussian cores in different scales, to obtain corresponding Gaussian images in different scales; performing a differentiating process on the Gaussian images in adjacent scales to obtain Gaussian differentiating images; determining an extreme point in each Gaussian differentiating image, wherein a value of the extreme point is larger than values of adjacent points in the Gaussian differentiating image and is larger than values of adjacent points in the Gaussian differentiating images in adjacent scales; and determining an extreme point as the first feature point if the value of the extreme point is larger than a second preset threshold.

As an example, in the method according to the embodiment of the present disclosure, the step of extracting, for each first feature point in the set of first feature points, a first descriptor describing feature information on the first feature point comprises: performing a normalization process on each first feature point, with the first feature point as a preset reference, to obtain a feature point region image; and acquiring the first descriptor of the first feature point using an off-line trained descriptor extractor, for the feature point region image.

As an example, in the method according to the embodiment of the present disclosure, the step of extracting, for each first feature point in the set of first feature points, a first descriptor describing feature information on the first feature point, comprises: determining, for each first feature point, a feature point region with the first feature point as a preset reference; dividing the feature point region into multiple sub regions and calculating gradient information on each sub region; calculating a multiple dimensional gradient histogram of each sub region based on the gradient information; and connecting the number of points in each dimension of the multiple dimensional gradient histogram as a feature vector, to obtain the first descriptor of the first feature point.

As an example, the method according to the embodiment of the present disclosure further comprises: detecting a set of first key points representing structure information on the image to be recognized; wherein, the step of detecting matched feature point pairs between the set of first feature points and the set of second feature points comprises: calculating a similarity transformation matrix between the image to be recognized and the registered image, based on the set of first key points and a set of second key points representing structure information on the registered image; calculating, for each first feature point, a match region in the registered image with respect to the first feature point, based on the similarity transformation matrix; and detecting the second feature point matching with the first feature point, in the match region.

As an example, in the method according to the embodiment of the present disclosure, the step of detecting the second feature point matching with the first feature point in the match region comprises: calculating, for each second feature point in the match region, an Euclidean distance between the first descriptor of the first feature point and the second descriptor of the second feature point; determining a relationship between a ratio between the smallest Euclidean distance and the second smallest Euclidean distance, and a third preset threshold; and determining the first feature point and the second feature point with the smallest Euclidean distance to the first descriptor of the first feature point in the match region as the matched feature point pair, if the ratio between the smallest Euclidean distance and the second smallest Euclidean distance is smaller than the third preset threshold.

As an example, the method according to the embodiment of the present disclosure further comprises: detecting a set of first key points representing structure information on the image to be recognized; wherein, the step of detecting matched feature point pairs between the set of first feature points and the set of second feature points comprises: calculating a similarity transformation matrix between the image to be recognized and the registered image, based on the set of first key points and a set of second key points representing structure information on the registered image; calculating, for each second feature point, a match region in the image to be recognized with respect to the second feature point, based on the similarity transformation matrix; and detecting the first feature point matching with the second feature point in the match region.

As an example, in the method according to the embodiment of the present disclosure, the step of detecting the first feature point matching with the second feature point in the match region comprises: calculating, for each first feature point in the match region, an Euclidean distance between the second descriptor of the second feature point and the first descriptor of the first feature point; determining a relationship between a ratio between the smallest Euclidean distance and the second smallest Euclidean distance, and a third preset threshold; and determining the second feature point and the first feature point with the smallest Euclidean distance to the second descriptor of the second feature point in the match region as the matched feature point pair, if the ratio between the smallest Euclidean distance and the second smallest Euclidean distance is smaller than the third preset threshold.

As an example, in the method according to the embodiment of the present disclosure, the second descriptor is obtained by steps of: acquiring the registered image; detecting the set of second feature points representing detail features of the registered image, in the registered image; extracting, for each second feature point in the set of second feature points, a second descriptor describing the feature information on the second feature point; and storing the second descriptor.

As an example, in the method according to the embodiment of the present disclosure, the step of calculating the number of the matched feature point pairs comprises: obtaining a preliminary match result of the matched feature point pairs between the set of first feature points and the set of second feature points, based on the first descriptor and the second descriptor; and screening the preliminary match result based on a Random Sample Consensus method, to obtain the matched feature point pairs.

According to another aspect of the present disclosure, a system for recognizing a face is provided, comprising: a processor; a memory; computer program instructions stored in the memory, which, when executed by the processor, perform steps of acquiring an image to be recognized, for the face; detecting a set of first feature points representing detail features of the image to be recognized, in the image to be recognized; extracting, for each first feature point in the set of first feature points, a first descriptor describing feature information on the first feature point; acquiring, for each second feature point in a set of second feature points, a second descriptor describing feature information on the second feature point, the set of second feature points representing detail features of a pre-stored registered image; detecting matched feature point pairs between the set of first feature points and the set of second feature points, based on the first descriptor and the second descriptor; calculating the number of the matched feature point pairs; and recognizing the image to be recognized as being consistent with the registered image, if the number of the matched feature point pairs is larger than a first preset threshold.

As an example, in the system according to the embodiment of the present disclosure, the computer program instructions, when executed by the processor, further perform steps of detecting a face region image in the image to be recognized; and wherein, the step of detecting the set of first feature points in the image to be recognized, which is performed by the computer program instructions when executed by the processor, further comprises: detecting the set of first feature points based on the face region image.

As an example, in the system according to the embodiment of the present disclosure, the step of detecting the set of first feature points which is performed by the computer program instructions when executed by the processor, comprises: scaling the face region image into different scales; and detecting a location and a size of the first feature point using an off-line trained feature point classifier, for the face region image in each scale.

As an example, in the system according to the embodiment of the present disclosure, the step of detecting the set of first feature points which is performed by the computer program instructions when executed by the processor, comprises: performing a convolution process on the face region image with Gaussian cores in different scales, to obtain corresponding Gaussian images in different scales; performing a differentiating process on the Gaussian images in adjacent scales to obtain Gaussian differentiating images; determining an extreme point in each Gaussian differentiating image, wherein a value of the extreme point is larger than values of adjacent points in the Gaussian differentiating image and is larger than values of adjacent points in the Gaussian differentiating images in adjacent scales; and determining an extreme point as the first feature point if the value of the extreme point is larger than a second preset threshold.

As an example, in the system according to the embodiment of the present disclosure, the step of extracting the first descriptor which is performed by the computer program instructions when executed by the processor, comprises: performing a normalization process on each first feature point, with the first feature point as a preset reference, to obtain a feature point region image; and acquiring the first descriptor of the first feature point using an off-line trained descriptor extractor, for the feature point region image.

As an example, in the system according to the embodiment of the present disclosure, the step of extracting the first descriptor which is performed by the computer program instructions when executed by the processor, comprises: determining, for each first feature point, a feature point region with the first feature point as a preset reference; dividing the feature point region into multiple sub regions and calculating gradient information on each sub region; calculating a multiple dimensional gradient histogram of each sub region based on the gradient information; and connecting the number of points in each dimension of the multiple dimensional gradient histogram as a feature vector, to obtain the first descriptor of the first feature point.

As an example, in the system according to the embodiment of the present disclosure, the computer program instructions when executed by the processor further perform steps of detecting a set of first key points representing structure information on the image to be recognized; wherein, the step of detecting matched feature point pairs between the set of first feature points and the set of second feature points which is performed by the computer program instructions when executed by the processor, comprises: calculating a similarity transformation matrix between the image to be recognized and the registered image, based on the set of first key points and a set of second key points representing structure information on the registered image; calculating, for each first feature point, a match region in the registered image with respect to the first feature point, based on the similarity transformation matrix; and detecting the second feature point matching with the first feature point in the match region.

As an example, in the system according to the embodiment of the present disclosure, the step of detecting the second feature point matching with the first feature point in the match region which is performed by the computer program instructions when executed by the processor, comprises: calculating, for each second feature point in the match region, an Euclidean distance between the first descriptor of the first feature point and the second descriptor of the second feature point; determining a relationship between a ratio between the smallest Euclidean distance and the second smallest Euclidean distance, and a third preset threshold; and determining the first feature point and the second feature point with the smallest Euclidean distance to the first descriptor of the first feature point in the match region as the matched feature point pair, if the ratio between the smallest Euclidean distance and the second smallest Euclidean distance is smaller than the third preset threshold.

As an example, in the system according to the embodiment of the present disclosure, the computer program instructions, when executed by the processor, further perform steps of: detecting a set of first key points representing structure information on the image to be recognized; wherein, the step of detecting matched feature point pairs between the set of first feature points and the set of second feature points, which is performed by the computer program instructions when executed by the processor, comprises: calculating a similarity transformation matrix between the image to be recognized and the registered image, based on the set of the first key points and a set of second key points representing structure information on the registered image; calculating, for each second feature point, a match region in the image to be recognized with respect to the second feature point, based on the similarity transformation matrix; and detecting the first feature point matching with the second feature point in the match region.

As an example, in the system according to the embodiment of the present disclosure, the step of detecting the first feature point matching with the second feature point in the match region, which is performed by the computer program instructions when executed by the processor, comprises: calculating, for each first feature point in the match region, an Euclidean distance between the second descriptor of the second feature point and the first descriptor of the first feature point; determining a relationship between a ratio between the smallest Euclidean distance and the second smallest Euclidean distance, and a third preset threshold; and determining the second feature point and the first feature point with the smallest Euclidean distance to the second descriptor of the second feature point in the match region as the matched feature point pair, if the ratio between the smallest Euclidean distance and the second smallest Euclidean distance is smaller than the third preset threshold.

As an example, in the system according to the embodiment of the present disclosure, the computer program instructions, when executed by the processor, further perform steps of: acquiring the registered image; detecting the set of second feature points representing detail features of the registered image, in the registered image; extracting, for each second feature point in the set of second feature points, a second descriptor describing feature information on the second feature point; and storing the second descriptor.

As an example, in the system according to the embodiment of the present disclosure, the step of calculating the number of the matched feature point pairs, which is performed by the computer program instructions when executed by the processor, comprises: obtaining a preliminary match result of the matched feature point pairs between the set of first feature points and the set of second feature points, based on the first descriptor and the second descriptor; and screening the preliminary match result based on a Random Sample Consensus method, to obtain the matched feature point pairs.

According to a further aspect of the present disclosure, a computer program product is provided, comprising a computer readable storage medium having stored thereon computer program instructions, which, when executed by a computer, perform steps of: acquiring an image to be recognized, for the face; detecting a set of first feature points representing detail features of the image to be recognized, in the image to be recognized; extracting, for each first feature point in the set of first feature points, a first descriptor describing feature information on the first feature point; acquiring, for each second feature point in a set of second feature points, a second descriptor describing feature information on the second feature point, the set of second feature points representing detail features of a pre-stored registered image; detecting matched feature point pairs between the set of first feature points and the set of second feature points, based on the first descriptor and the second descriptor; calculating the number of the matched feature point pairs; and recognizing the image to be recognized as being consistent with the registered image, if the number of the matched feature point pairs is larger than a first preset threshold.

Other features and advantages of the present disclosure will be described in the following description, and become apparent partly from the description or understood through an implementation of the present disclosure. The object and other advantages of the present disclosure may be realized and obtained by structures specifically pointed out in the description, the claims and the accompanying drawings.

BRIEF DESCRIPTION OF THE DRAWINGS

The above and other objects, features and advantages of the present disclosure will become more apparent from the detailed description of the embodiments of the present disclosure, with reference to the accompanying drawings given for a better understanding of the embodiments of the present disclosure, which constitute a part of the specification and are given by way of illustration of the present disclosure together with the embodiments of the present disclosure, and thus are not limitative of the present disclosure. In the accompany drawings, generally, like reference numerals denote like components or steps, in which.

DETAILED DESCRIPTION

In order to make the objects, the technical solutions and the advantages of the present disclosure more apparent, hereinafter, exemplary embodiments of the present disclosure will be described in detail with reference to the accompany drawings. Apparently, the described embodiments are only a part of but not all, embodiments of the present disclosure. It should be understood that the present disclosure is not limited to the exemplary embodiments described herein. All the other embodiments derived from the embodiments of the present disclosure described herein by those skilled in the art, without any inventive labor, shall fall within the protection scope of the present disclosure.

Figure 1:
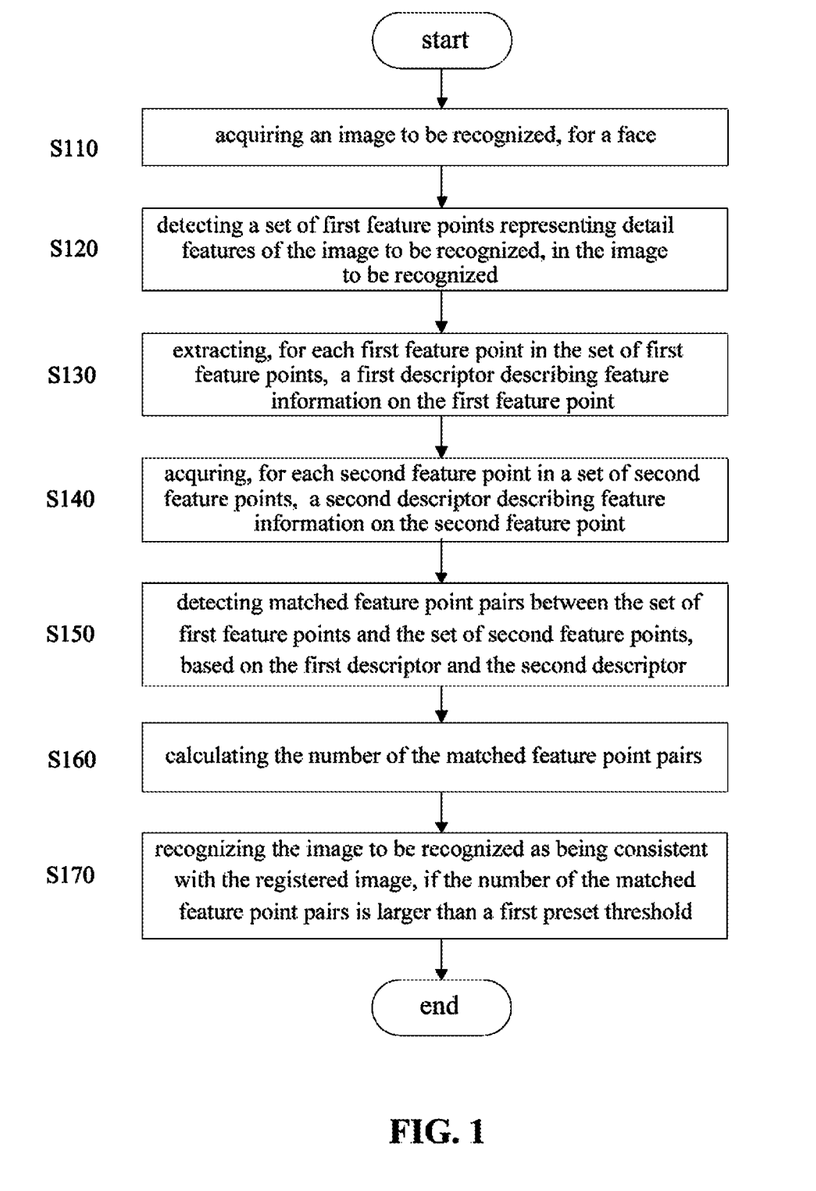
FIG. 1 is a flowchart schematically showing main steps of a face recognition method according to an embodiment of the present disclosure.

FIG. 1 is a flowchart schematically showing main steps of a face recognition method according to an embodiment of the present disclosure.

As shown in FIG. 1, first, in a step S110, an image to be recognized is acquired for the face, in the face recognition method according to the embodiment of the present disclosure. In an example, the face recognition method photographs the face by a camera to obtain the image to be recognized. In another example, the face recognition method acquires an image which was captured previously from a memory as the image to be recognized.

In an embodiment of the present disclosure, a resolution of the image is larger than a preset resolution threshold. The preset resolution threshold may be set to, for example, 500*500. Thereby, the image can include detail features which are not included in an image with a low resolution, and can reflect a micro structure and a texture of the skin, such as the pore, the mole, the macula, the scar, or the like.

Of course, those skilled in the art may understand that the above preset resolution threshold is only an example. The present disclosure is not limited thereto, and those skilled in the art may set the resolution threshold properly depending on requirements.

Next, in a step S120, the face recognizing method detects a set of first feature points representing detail features of the image to be recognized, in the image to be recognized.

Particularly, the set of first feature points includes one or more first feature points. Each first feature point represents a detail feature of the image to be recognized. The detail feature includes, for example, a size and a distribution of the pore, the wrinkle, the scar, the mole, the macula, or the like. These detail features, which are unique to each person, can be recognized from the image to be recognized with a resolution larger than the preset resolution threshold, but are hard to be recognized accurately, or cannot be recognized, from a general image with the low resolution.

In the embodiment of the present disclosure, the first feature point may be detected in various ways.

In a first example, firstly, the face recognition method may detect a face region image in the image to be recognized. Particularly, for example, the face recognition method may use an off-line trained Adaboost-cascade face detector to detect the location and the size of the face in the image to be recognized. Of course, the method for detecting the face region image described above is only an example. Many other face detection methods may be used by those skilled in the art to detect the face region image in the image to be recognized, and they all fall within the protection scope of the present disclosure.

Next, the face recognition method may detect the set of first feature points based on the face region image. Particularly, the face recognition method may scale the face region image into different scales, and detect the location and the size of the first feature point using an off-line trained feature point classifier, for the face region image in each scale.

That is, in this example, the face recognition method detects the first feature point using the off-line trained feature point classifier in a learning way. Particularly, the face recognition method scales the face image into different scales based on the detection result of the face region image, and performs the detection using the off-line trained Convolutional Neural Network (CNN) classifier in a way such as a slide window, or the like, in each scale, so that the location and the size of the first feature point are detected. More particularly, the off-line trained CNN includes an input layer, a convolution (conv) layer, a pooling layer, a fully-connected layer, and an output layer (the classifier). There may be several convolution layers and pooling layers. The fully-connected layer is equivalent to a hidden layer in a multi-layer perception (MLP). The output layer is the classifier, which may be expressed by, for example, Logistics Regression. Those skilled in the art may train the CNN off-line in various ways which will not be described here in detail.

In a second example, the face recognition method detects the first feature point directly using gradient information on the face image. Particularly, in this example, considering that these face feature points such as the pore, the mole, the slight wrinkle or the like, are generally darker than the adjacent skin region and these points are efficient in the recognition, in this example, the face recognition method detects these points by a Gaussian differentiating image.

More particularly, first, similarly, the face recognition method detects the face region image in the image to be recognized in the way as described above.

Then, the face recognition method may perform a convolution process on the face region image with Gaussian cores in different scales ($\sigma$, $k\sigma$, $k^2\sigma$, . . . ), to obtain corresponding Gaussian images in different scales.

Then, as shown in the following equation (1), the face recognition method performs a differentiating process on the Gaussian images in adjacent scales to obtain Gaussian differentiating images.

$$D(x, y, \sigma) = L(x, y, k\sigma) - L(x, y, \sigma) \quad (1)$$
$$= (G(x, y, k\sigma) - G(x, y, \sigma)) * I(x, y)$$

wherein, $D(x,y,\sigma)$ denotes a Gaussian differentiating image between two Gaussian images in adjacent scales $\sigma$ and $k\sigma$ respectively, $L(x,y,k\sigma)$ denotes a Gaussian image in scale $\sigma$, $G(x,y,k\sigma)$ denotes a Gaussian image in scale $k\sigma$ and I(x,y) denotes the original image to be recognized. L(x,y,σ) is a Gaussian image in scale σ which is obtained by a convolution of the image I(x,y) with the Gaussian core $$G(x, y, \sigma) = \frac{1}{2\pi\sigma^2}\exp(-(x^2 + y^2)/2\sigma^2),$$

and x and y are the horizontal coordinate and the vertical coordinate of each pixel in the image to be recognized, respectively.

Next, the face recognition method determines an extreme point in each Gaussian differentiating image. Particularly, a value of the extreme point is larger than values of adjacent points in the Gaussian differentiating image and is larger than values of adjacent points in the Gaussian differentiating images in adjacent scales.

If the values of all extreme points are not larger than a second preset threshold, the face recognition method determines that there is not first feature point in this Gaussian differentiating image. On the other hand, if the value of a certain extreme point is larger than the second preset threshold, the face recognition method determines this extreme point as the first feature point. In an example, the second preset threshold is an adaptive threshold which makes the number of the first feature points in one side of the cheek region in a proper range, for example, between 400 to 600.

By performing the determination as described above on each Gaussian differentiating image, the face recognition method detects all the first feature points in the image to be recognized. As an experiential but not limitative example, the number of the first feature points in the image to be recognized is about several thousands, such as around 5000.

It is to be noted that the two ways for detecting the first feature point as described above are only examples. Those skilled in the art can detect the first feature points representing the detail feature of the image to be recognized in many other ways on the basis of the above examples.

Next, in a step S130, the face recognition method extracts, for each first feature point in the set of first feature points, a first descriptor describing feature information on the first feature point. The first descriptor corresponds to the first feature point, and describes the feature information on the first feature point, that is, local feature information.

In the embodiment of the present disclosure, the first descriptor may be extracted in various ways. In a first example, the face recognition method may extract the first descriptor of the first feature point by using the off-line trained CNN in the learning way.

Particularly, for each first feature point, the face recognition method performs a normalization process with the first feature point as a preset reference, to obtain a feature point region image. Then, for the feature point region image, the face recognition method extracts the first descriptor of the first feature point using the off-line trained descriptor extractor.

More particularly, for each first feature point, the face recognition method may perform the normalization process with the first feature point as a preset reference, such as the center, to obtain the feature point region image. Then, the face recognition method inputs the feature point region image to the off-line trained CNN, i.e., the descriptor extractor as described above, to obtain the first descriptor. The off-line trained CNN includes the input layer, the convolution layer, the pooling layer, the fully-connected layer and the output layer as described above. As described above, there may be several convolution layers and pooling layers. The fully-connected layer is equivalent to the hidden layer in the MLP. The output layer is the descriptor extractor, which may be expressed by, for example, Logistics Regression (softmax).

In a second example, the face recognition method may extract the gradient of the face region image directly as the local descriptor of the feature point, based on the gradient of the face region image, according to the first feature point and the corresponding scale.

Particularly, first, for each first feature point, the face recognition method may determine a feature point region with the first feature point as a preset reference. For example, the face recognition method may determine a feature point region with a predetermined shape, such as a square or a circle, around each first feature point, with the first feature point as the center and N times of the scale of the feature point as the radius, wherein N is a positive integer, such as 5. Next, the face recognition method divides the feature point region into multiple, such as 4×4, sub regions, and calculates gradient information on each sub region. Next, the face recognition method calculates a multiple dimensional (such as 32 dimensional) gradient histogram of each sub region based on the gradient information, and connects the number of points in each dimension of the multiple dimensional gradient histogram as a feature vector, to obtain the first descriptor of the first feature point. Of course, the connected feature vector may be subjected to a further process such as a normalization process, or the like, to obtain the first descriptor.

Thereby, with the processes in the steps S110-S130, the face recognition method obtains the set of the first descriptor of the image to be recognized.

On the other hand, in a step S140, the face recognition method acquires, for each second feature point in a set of second feature points, a second descriptor describing feature information on the second feature point. The set of second feature points represents detail features of a pre-stored registered image.

Particularly, the second feature point may be obtained in advance by the following pre-processing. First, the face recognition method acquires the registered image. Similarly to that in the above step S110, the face recognition method may capture the registered image in real-time by the camera, or obtain the registered image which was captured previously from the memory. The resolution of the registered image is also larger than the preset resolution threshold.

Next, the face recognition method detects a set of second feature points representing detail features of the registered image, and extracts, for each second feature point in the set of second feature points, a second descriptor describing feature information on the second feature point. The processes for detecting the second feature point in the registered image and extracting the second descriptor of the second feature point are similar to the processes for detecting the first feature point in the step S120 and extracting the first descriptor in the step S130, and will not be repeated here. After extracting the second descriptor, the face recognition method may store it in the memory by way of a database, for example.

It is to be noted that although the step S140 is shown to be after the processes of the steps S110-S130 in the flow-chart shown in FIG. 1, actually, the processes of the steps S110-S130 and the process of the step S140 may be performed in an order other than that in FIG. 1, such as in parallel or inversely.

Also, in addition to the above steps S110-S140, the face recognition method may further comprise a step of detecting a set of first key points representing structure information on the image to be recognized, independently from the above steps. Particularly, as described above, the face recognition method may detect the face region image in the image to be recognized. Further, the face recognition method may detect the information, such as the location, or the like, on the first feature point in the face in various ways, such as an Active Appearance Model (AAM), or the like. The first feature point represents the structure information on the image to be recognized, such as the eyes, the nose, the mouth, or the like.

Next, in a step S150, the face recognition method detects matched feature point pairs between the set of first feature points and the set of second feature points, based on the first descriptor and the second descriptor.

The face recognition method may detect the matched feature point pairs between the set of first feature points and the set of second feature points in various ways. In a first example, first, the face recognition method calculates a similarity transformation matrix between the image to be recognized and the registered image, based on the set of the first key points and a set of second key points representing structure information on the registered image. Particularly, the set of second key points may be detected and stored in the database in advance in a way similar to that in the set of first key points. Alternatively, the set of second key points may also be detected in real time in a way similar to that in the set of first key points, in a proper step of the face recognition method. Thereby, the face recognition method calculates the similarity transformation matrix between the image to be recognized and the registered image, so that the Euclidean distance between the set of first key points in the image to be recognized and the set of second key points in the registered image is the minimum.

Next, the face recognition method calculates a match region in the registered image with respect to the first feature point based on the similarity transformation matrix, for each first feature point. That is, the face recognition method takes a first feature point P (x1,y1) in the image to be recognized in order, and determines a corresponding position Q (x2,y2) in the registered image based on its coordinates in the image to be recognized and the similarity transformation matrix obtained through the above calculation, wherein x1 and y1 are the horizontal coordinate and the vertical coordinate of the first feature point P in the image to be recognized, respectively, and x2 and y2 are the horizontal coordinate and the vertical coordinate of the corresponding position Q in the registered image, respectively. Then, the face recognition method determines a circular region as the match region, with Q(x2,y2) as the center for example, and with n times of the height of the face as the radius, wherein n is a number between 0 and 1, for example, 0.1. Of course, it is to be noted that the determination of the match region as described above is only an example. Those skilled in the art may determine the match region with another shape such as a rectangular or the like, with Q (x2,y2) as another predetermined reference such as the upper left point or the like, which is also within the scope of the present disclosure.

Then, the face recognition method detects a second feature point matching with the first feature point in the match region. More particularly, first, the face recognition method calculates, for each second feature point in the match region, an Euclidean distance between the first descriptor of the first feature point and the second descriptor of the second feature point, then calculates a ratio between the smallest Euclidean distance and the second smallest Euclidean distance among the respective Euclidean distances obtained as described above, and determines the relationship between the ratio and a third preset threshold. The third preset threshold may be set properly by those skilled in the art depending on the requirement for accuracy. As an example, the third preset threshold may be set to 0.8.

If the ratio between the smallest Euclidean distance and the second smallest Euclidean distance is not smaller than the third preset threshold, the face recognition method determines that there is no second feature point matched with the first feature point in the match region.

On the other hand, if the ratio between the smallest Euclidean distance and the second smallest Euclidean distance is smaller than the third preset threshold, the face recognition method determines the first feature point and the second feature point with the smallest Euclidean distance to the first descriptor of the first feature point in the match region as the matched feature point pair.

In the above first example, it is determined, for each first feature point in the set of first feature points, whether there is a second feature point matched with the first feature point, in the match region of the registered image. Accordingly, the face recognition method according to the embodiment of the present disclosure may also determine, for each second feature point in the set of second feature points, whether there is a first feature point matched with the second feature point, in the match region of the image to be recognized.

Particularly, in a second example, first, similarly, the face recognition method calculates a similarity transformation matrix between the image to be recognized and the registered image, based on the set of the first key points and a set of second key points representing structure information on the registered image.

Next, the face recognition method calculates a match region in the image to be recognized with respect to the second feature point based on the similarity transformation matrix, for each second feature point. Similarly, the face recognition method takes a second feature point Q (x2,y2) in the registered image in order, and determines a corresponding position P (x1,y1) in the image to be recognized based on the coordinates in the registered image and the similarity transformation matrix obtained through the above calculation, wherein x2 and y2 are the horizontal coordinate and the vertical coordinate of the second feature point Q in the registered image respectively, and x1 and y1 are the horizontal coordinate and the vertical coordinate of the corresponding position P in the image to be recognized, respectively. Then, the face recognition method determines a circular region as the match region, with P (x1,y1) as the center for example, and with n times of the height of the face as the radius, wherein n is a number between 0 and 1, for example, 0.1. Similarly, the determination of the match region as described above is only an example.

Then, the face recognition method detects a first feature point matching with the second feature point in the match region. More particularly, first, the face recognition method calculates, for each first feature point in the match region, an Euclidean distance between the second descriptor of the second feature point and the first descriptor of the first feature point, then calculates a ratio between the smallest Euclidean distance and the second smallest Euclidean distance among the respective Euclidean distances obtained as described above, and determines the relationship between the ratio and a third preset threshold. The third preset threshold may be set properly by those skilled in the art depending on the requirement for accuracy. As an example, the third preset threshold may be set to 0.8.

If the ratio between the smallest Euclidean distance and the second smallest Euclidean distance is not smaller than the third preset threshold, the face recognition method determines that there is no first feature point matched with the second feature point in the match region.

On the other hand, if the ratio between the smallest Euclidean distance and the second smallest Euclidean distance is smaller than the third preset threshold, the face recognition method determines the second feature point and the first feature point with the smallest Euclidean distance to the second descriptor of the second feature point in the match region as the matched feature point pair.

Thereby, the face recognition method detects all the matched feature point pairs between the set of first feature points and the set of second feature points, through the process of the step S150.

Next, the face recognition method proceeds to a step S160, in which the number of the matched feature point pairs is calculated. In a first example, the face recognition method counts all the matched feature point pairs simply. In a second example, in order to make the recognition result more accurate, the face recognition method may obtain a preliminary match result of the matched feature point pairs between the set of first feature points and the set of second feature points through the process in the step S150 as described above, based on the first descriptor and the second descriptor. Then, the face recognition method screens the preliminary match result based on a Random Sample Consensus (RANSAC) method, to obtain the matched feature point pairs. Of course, the above two ways are only examples. Those skilled in the art may screen the result obtained through the process in the step S150 as described above according to other rules, to make the final recognition result more accurate.

Finally, in a step S170, the face recognition method recognizes the image to be recognized as being consistent with the registered image, if the number of the matched feature point pairs is larger than a first preset threshold. On the other hand, if the number of the matched feature point pairs is not larger than the first preset threshold, the face recognition method recognizes the image as not being consistent with the registered image. The first preset threshold may be set properly by those skilled in the art according to requirements. In an example, the first preset threshold may be set to 1000.

The face recognition method according to the embodiment of the present disclosure has been described above with reference to FIG. 1. In the face recognition method according to the embodiment of the present disclosure, the feature points representing detail features of the image to be recognized are detected from the face image with the high resolution, and it is determined whether the image to be recognized is consistent with the registered image stored in advance based on the feature points, and thereby the face is recognized. Since the face recognition is performed using detail features of the face unique to each person, such as the pore, the mole, the macula, the scar, or the like, very similar faces including faces of identical twins or the like may be distinguished, the accuracy of the face recognition is improved, and the security of the scenario in which the face recognition is applied is improved, so that it may be applied to locations such as the bank, the public security or the like which requires a very high level of security.

Further, the face recognition method according to the embodiment of the present disclosure does not require any special hardware, and thus may be deployed at a face image capture terminal. For example, in a security application field, it may be deployed at an image capture terminal of the access control system; in a finance application field, it may be deployed at a personal terminal, such as a smart phone, a tablet, a personal computer; and so on. Of course, the face recognition method according to the embodiment of the present disclosure is not limited thereto, and may be deployed at the server side (or the cloud side) and the client side in a distributed way.

Figure 2:
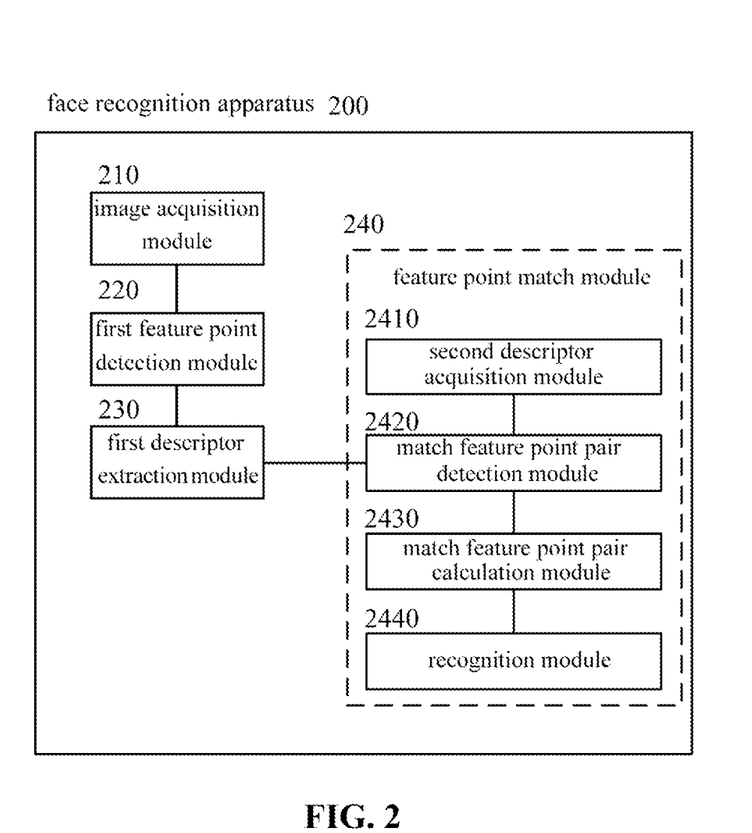
FIG. 2 is a block diagram schematically showing a main configuration of a face recognition apparatus according to an embodiment of the present disclosure.

FIG. 2 is a block diagram schematically showing a main configuration of a face recognition apparatus according to an embodiment of the present disclosure. As shown in FIG. 2, a face recognition apparatus 200 according to the embodiment of the present disclosure mainly includes: an image acquisition module 210, a first feature point detection module 220, a first descriptor extraction module 230 and a feature point match module 240. The feature point match module 240 may include a second descriptor acquisition module 2410, a match feature point pair detection module 2420, a match feature point pair calculation module 2430 and a recognition module 2440.

In addition, the face recognition apparatus according to the embodiment of the present disclosure may further include a face detection module and a key point detection module not shown. The face detection module detects the face region image in the image to be recognized. The key point detection module detects a set of first feature points representing structure information on the image to be recognized.

Particularly, the image acquisition module 210 acquires an image to be recognized for the face. As an example, the image acquisition module 210 may obtain the image to be recognized by photographing the face though a camera. In an embodiment of the present disclosure, a resolution of the image is larger than a preset resolution threshold. The preset resolution threshold may be set to, for example, 500*500. That is, the camera is a high resolution camera. In particular, the camera may be various cameras such as a normal digital camera, a cell phone camera, a USB camera or a networked camera, or the like. Thereby, the image can include detail features which are not included in an image with a low resolution, and can reflect a micro structure and a texture of the skin, such as the pore, the mole, the macula, the scar, or the like.

The first feature point detection module 220 detects a set of first feature points representing detail features of the image to be recognized, in the image to be recognized.

Particularly, in a first example, the first feature point detection module 220 scales the face region image into different scales, and detects a location and a size of the first feature point using an off-line trained feature point classifier, for the face region image in each scale.

More particularly, the first feature point detection module 220 includes a feature point detector based on an off-line trained CNN. The off-line trained CNN includes an input layer, a convolution layer, a pooling layer, a fully-connected layer, and an output layer (the classifier). There may be several convolution layers and pooling layers. The fully-connected layer is equivalent to the hidden layer in the MLP. The output layer is the classifier, which may be expressed by, for example, Logistics Regression. The feature point detector may scale the face region image into different scales based on the detection result of the face region image by the face detection module, and detect a location and a size of the first feature point using an off-line trained CNN classifier, in a way such as a slide window, or the like, in each scale.

In a second example, the first feature point detection module 220 is a feature point detector based on gradient information on the face image. The first feature point detection module 220 detects the first feature point directly using gradient information on the face image directly. More particularly, the first feature point detection module 220 may be implemented as hardware, software, firmware or any feasible combination of them. Exemplarily, the first feature point detection module 220 may be realized as software executed in the computer, which, when executed by the computer, performs the following processes.

First, the face region image is convoluted with Gaussian cores in different scales ($\sigma$, $k\sigma$, $k^2\sigma$, ...), to obtain corresponding Gaussian images in different scales.

Then, based on the above equation (1), the Gaussian images in adjacent scales are differentiated to obtain Gaussian differentiating images.

Next, the extreme point in each Gaussian differentiating image is determined. Particularly, a value of the extreme point is larger than values of adjacent points in the Gaussian differentiating image and is larger than values of adjacent points in the Gaussian differentiating images in adjacent scales.

If the values of all the extreme points are not larger than a second preset threshold, it is determined that there is not first feature point in this Gaussian differentiating image. On the other hand, if the value of a certain extreme point is larger than the second preset threshold, this extreme point is determined as the first feature point.

By performing the determination as described above on each Gaussian differentiating image, the first feature point detection module 220 may detect all the first feature points in the image to be recognized. As an experiential but not limitative example, the number of the first feature points in the image to be recognized is about several thousands, such as 5000.

It is to be noted that the two ways for detecting the first feature point as described above are only examples. Those skilled in the art can configure the first feature point detection module 220 to detect the first feature points representing the detail feature of the image to be recognized in many other ways on the basis of the above examples.

The first descriptor extraction module 230 extracts, for each first feature point in the set of first feature points, a first descriptor describing feature information on the first feature point.

In a first example, the first descriptor extraction module 230 may include a feature point region image obtainment module and a first descriptor acquisition module not shown.

The feature point region image obtainment module performs, for each first feature point, a normalization process with the first feature point as a preset reference, to obtain a feature point region image. The first descriptor acquisition module acquires the first descriptor of the first feature point using an off-line trained descriptor extractor, for the feature point region image.

More particularly, for each first feature point, the feature point region image obtainment module may perform the normalization process with the first feature point as a preset reference, such as the center, to obtain the feature point region image. Then, the first descriptor acquisition module inputs the feature point region image to the off-line trained CNN, i.e., the descriptor extractor as described above, to obtain the first descriptor. The off-line trained CNN includes the input layer, the convolution layer, the pooling layer, the fully-connected layer and the output layer as described above. As described above, there may be several convolution layers and pooling layers. The fully-connected layer is equivalent to the hidden layer in the MLP. The output layer may be expressed by, for example, Logistics Regression.

In a second example, the first descriptor extraction module 230 may extract the gradient of the face region image directly as local descriptor of the feature point based on the gradient of the face region image, according to the first feature point and the corresponding scale. More particularly, the first descriptor extraction module 230 may be implemented as hardware, software, firmware or any feasible combination of them. Exemplarily, the first descriptor extraction module 230 may be implemented as software executed in the computer, which, when executed by the computer, performs the following processes.

First, for each first feature point, a feature point region may be determined with the first feature point as a preset reference. For example, a feature point region with a predetermined shape, such as a square or a circle, may be determined around each first feature point, with the first feature point as the center and N times of the scale of the feature point as the radius, wherein N is a positive integer, such as 5.

Next, the feature point region is divided into multiple, such as 4×4, sub regions, and gradient information on each sub region is calculated.

Next, a multiple dimensional (such as 32 dimensional) gradient histogram of each sub region is calculated based on the gradient information.

Finally, the number of points in each dimension of the multiple dimensional gradient histogram is connected as a feature vector, to obtain the first descriptor of the first feature point. Of course, the connected feature vector may be subjected to a further process such as a normalization process, or the like, to obtain the first descriptor.

The feature point match module 240 determines whether the image to be recognized is consistent with the registered image based on the first descriptor and the second descriptor obtained as described above.

Particularly, the second descriptor acquisition module 2410 acquires, for each second feature point in a set of second feature points, a second descriptor describing feature information on the second feature point. The set of second feature points represents detail features of a pre-stored registered image. More particularly, the second descriptor acquisition module 2410 acquires the registered image, detects the set of second feature points representing detail features of the registered image in the registered image, extracts, for each second feature point in the set of second feature points, a second descriptor describing feature information on the second feature point, and stores the second descriptor.

The match feature point pair detection module 2420 detects matched feature point pairs between the set of first feature points and the set of second feature points, based on the first descriptor and the second descriptor. In a first example, first, the match feature point pair detection module 2420 calculates a similarity transformation matrix between the image to be recognized and the registered image, based on the set of the first key points and a set of second key points representing structure information on the registered image. Particularly, the set of second key points may be detected and stored in the database in advance in a way similar to that in the set of first key points. The match feature point pair detection module 2420 calculates the similarity transformation matrix between the image to be recognized and the registered image, so that the Euclidean distance between the set of first key points in the image to be recognized and the set of second key points in the registered image is the minimum.

Next, the match feature point pair detection module 2420 calculates a match region in the registered image with respect to the first feature point based on the similarity transformation matrix, for each first feature point. That is, the match feature point pair detection module 2420 takes a first feature point P (x1,y1) in the image to be recognized in order, and determines the corresponding position Q (x2,y2) in the registered image according to its coordinates in the image to be recognized and the similarity transformation matrix obtained through the above calculation. Then, the match feature point pair detection module 2420 determines a circular region as the match region, with Q (x2,y2) as the center for example, and with n times of the height of the face as the radius, wherein n is a number between 0 and 1, for example, 0.1. Of course, it is to be noted that the determination of the match region as described above is only an example. Those skilled in the art may determine the match region with another shape such as a rectangular or the like, with Q (x2,y2) as another predetermined reference such as the upper left point or the like, which is also within the scope of the present disclosure.

Then, the match feature point pair detection module 2420 detects a second feature point matching with the first feature point in the match region. More particularly, first, the match feature point pair detection module 2420 calculates, for each second feature point in the match region, an Euclidean distance between the first descriptor of the first feature point and the second descriptor of the second feature point, then calculates a ratio between the smallest Euclidean distance and the second smallest Euclidean distance among the respective Euclidean distances obtained through the above calculation, and determines the relationship between the ratio and a third preset threshold. The third preset threshold may be set properly by those skilled in the art depending on the requirement for accuracy. As an example, the third preset threshold may be set to 0.8.

If the ratio between the smallest Euclidean distance and the second smallest Euclidean distance is not smaller than the third preset threshold, the match feature point pair detection module 2420 determines that there is no second feature point matched with the first feature point in the match region.

On the other hand, if the ratio between the smallest Euclidean distance and the second smallest Euclidean distance is smaller than the third preset threshold, the match feature point pair detection module 2420 determines the first feature point and the second feature point with the smallest Euclidean distance to the first descriptor of the first feature point in the match region as the matched feature point pair.

In the above first example, it is determined, for each first feature point in the set of first feature points, whether there is a second feature point matched with the first feature point, in the match region of the registered image. Accordingly, it may also be determined, for each second feature point in the set of second feature points, whether there is a first feature point matched with the second feature point, in the match region of the image to be recognized.

Particularly, in a second example, first, similarly, the match feature point pair detection module 2420 calculates a similarity transformation matrix between the image to be recognized and the registered image, based on the set of the first key points and a set of second key points representing structure information on the registered image.

Next, the match feature point pair detection module 2420 calculates a match region in the image to be recognized with respect to the second feature point based on the similarity transformation matrix, for each second feature point. Similarly, the match feature point pair detection module 2420 takes a second feature point Q(x2,y2) in the registered image in order, and determines the corresponding position P (x1, y1) in the image to be recognized based on the coordinates in the registered image and the similarity transformation matrix obtained through the above calculation. Then, the match feature point pair detection module 2420 determines a circular region as the match region, with Q (x2,y2) as the center for example, and with n times of the height of the face as the radius, wherein n is a number between 0 and 1, for example, 0.1. Similarly, the determination of the match region as described above is only an example.

Then, the match feature point pair detection module 2420 detects a first feature point matching with the second feature point in the match region. More particularly, first, the match feature point pair detection module 2420 calculates, for each first feature point in the match region, an Euclidean distance between the second descriptor of the second feature point and the first descriptor of the first feature point, then calculates a ratio between the smallest Euclidean distance and the second smallest Euclidean distance among the respective Euclidean distances obtained as described above, and determines the relationship between the ratio and a third preset threshold. The third preset threshold may be set properly by those skilled in the art depending on the requirement for accuracy. As an example, the third preset threshold may be set to 0.8.

If the ratio between the smallest Euclidean distance and the second smallest Euclidean distance is not smaller than the third preset threshold, the match feature point pair detection module 2420 determines that there is no first feature point matched with the second feature point in the match region.

On the other hand, if the ratio between the smallest Euclidean distance and the second smallest Euclidean distance is smaller than the third preset threshold, the match feature point pair detection module 2420 determines the second feature point and the first feature point with the smallest Euclidean distance to the second descriptor of the second feature point in the match region as the matched feature point pair.

Thereby, the match feature point pair detection module 2420 detects all the matched feature point pairs between the set of first feature points and the set of second feature points.

The match feature point pair calculation module 2430 calculates the number of the matched feature point pairs. In a first example, the match feature point pair calculation module 2430 counts all the matched feature point pairs simply. In a second example, in order to make the recognition result more accurate, the match feature point pair calculation module 2430 may screen the preliminary match result obtained by the match feature point pair detection module 2420, based on the RANSAC method, to obtain the matched feature point pairs. Of course, the above two ways are only examples. The match feature point pair calculation module 2430 may screen the result obtained by the match feature point pair detection module 2420 as described above according to other rules, to make the final recognition result more accurate.

Next, the recognition module 2440 recognizes the image to be recognized as being consistent with the registered image, if the number of the matched feature point pairs is larger than a first preset threshold. On the other hand if the number of the matched feature point pairs is not larger than a first preset threshold, the recognition module 2440 recognizes the image as not being consistent with the registered image. The first preset threshold may be set properly by those skilled in the art according to requirements. In an example, the first preset threshold may be set to 1000.

It is to be noted that, the respective modules in the face recognition apparatus 200 may all be implemented as hardware, software, firmware or any feasible combination of them. Exemplarily, the respective modules in the face recognition apparatus 200 in the embodiment of the present disclosure may be implemented as software executed in the computer, which, when executed by the computer, performs the above processes.

Figure 3:
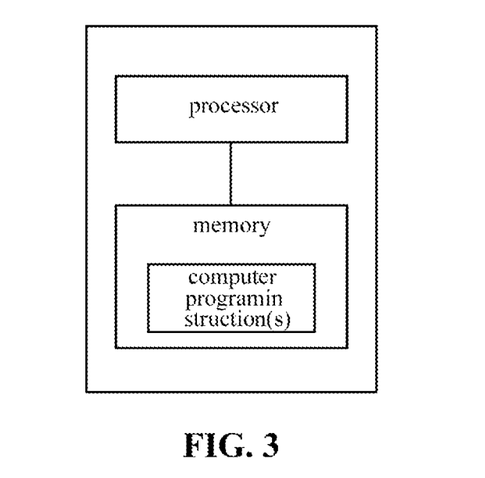
FIG. 3 is a block diagram schematically showing a face recognition system according to an embodiment of the present disclosure.

FIG. 3 is a schematic block diagram showing a face recognition system according to an embodiment of the present disclosure.

As shown in FIG. 3, the face recognition system according to an embodiment of the present disclosure includes a processor; a memory; and computer program instructions stored in the memory.

The computer program instructions, when executed by the processor, may realize respective function modules in the face recognition apparatus according to the embodiment of the present disclosure, and/or perform the face recognition system according to the embodiment of the present disclosure.

Particularly, the computer program instructions, when executed by the processor, perform the following steps: acquiring an image to be recognized, for the face; detecting a set of first feature points representing detail features of the image to be recognized, in the image to be recognized; extracting, for each first feature point in the set of first feature points, a first descriptor describing feature information on the first feature point; acquiring, for each second feature point in a set of second feature points, a second descriptor describing feature information on the second feature point, the set of second feature points representing detail features of a pre-stored registered image; detecting matched feature point pairs between the set of first feature points and the set of second feature points, based on the first descriptor and the second descriptor; calculating the number of the matched feature point pairs; and recognizing the image to be recognized as being consistent with the registered image, if the number of the matched feature point pairs is larger than a first preset threshold.

As an example, the computer program instructions, when executed by the processor, further perform steps of detecting a face region image in the image to be recognized; and wherein, the step of detecting the set of first feature points in the image to be recognized, which is performed by the computer program instruction when executed by the processor, further comprises: detecting the set of first feature points based on the face region image.

As another example, the step of detecting the set of first feature points, which is performed by the computer program instructions when executed by the processor, comprises: scaling the face region image into different scales; and detecting a location and a size of the first feature point using an offline trained feature point classifier, for the face region image in each scale.

As a further example, the step of detecting the set of first feature points, which is performed by the computer program instructions when executed by the processor, comprises: performing a convolution process on the face region image with Gaussian cores in different scales, to obtain corresponding Gaussian images in different scales; performing a differentiating process on the Gaussian images in adjacent scales to obtain Gaussian differentiating images; determining an extreme point in each Gaussian differentiating image, wherein a value of the extreme point is larger than values of adjacent points in the Gaussian differentiating image and is larger than values of adjacent points in the Gaussian differentiating images in adjacent scales; and determining an extreme point as the first feature point if the value of the extreme point is larger than a second preset threshold.

As a further example, the step of extracting the first descriptor, which is performed by the computer program instructions when executed by the processor, comprises: performing a normalization process on each first feature point, with the first feature point as a preset reference, to obtain a feature point region image; and for the feature point region image, acquiring the first descriptor of the first feature point using an off-line trained descriptor extractor.

As a further example, the step of extracting the first descriptor, which is performed by the computer program instructions when executed by the processor, comprises: for each first feature point, determining a feature point region with the first feature point as a preset reference; dividing the feature point region into multiple sub regions and calculating gradient information on each sub region; calculating a multiple dimensional gradient histogram of each sub region based on the gradient information; and connecting the number of points in each dimension of the multiple dimensional gradient histogram as a feature vector, to obtain the first descriptor of the first feature point.

As a further example, the computer program instructions, when executed by the processor, further perform steps of: detecting a set of first key points representing structure information on the image to be recognized; wherein, the step of detecting matched feature point pairs between the set of first feature points and the set of second feature points performed by the computer program instructions when executed by the processor comprises: calculating a similarity transformation matrix between the image to be recognized and the registered image, based on the set of the first key points and a set of second key points representing structure information on the registered image; for each first feature point, calculating a match region in the registered image with respect to the first feature point, based on the similarity transformation matrix; and detecting the second feature point matching with the first feature point in the match region.

As a further example, the step of detecting a second feature point matching with the first feature point in the match region, which is performed by the computer program instructions when executed by the processor, comprises: calculating, for each second feature point in the match region, an Euclidean distance between the first descriptor of the first feature point and a second descriptor of the second feature point; determining a relationship between a ratio between the smallest Euclidean distance and the second smallest Euclidean distance, and a third preset threshold; and if the ratio between the smallest Euclidean distance and the second smallest Euclidean distance is smaller than the third preset threshold, the first feature point and the second feature point with the smallest Euclidean distance to the first descriptor of the first feature point in the match region are determined as the matched feature point pair.

As a further example, the computer program instructions, when executed by the processor, further performs steps of: detecting a set of first key points representing structure information on the image to be recognized; wherein, the step of detecting matched feature point pairs between the set of first feature points and the set of second feature points, which is performed by the computer program instructions when executed by the processor, comprises: calculating a similarity transformation matrix between the image to be recognized and the registered image, based on the set of the first key points and a set of second key points representing structure information on the registered image; for each second feature point, calculating a match region in the image to be recognized with respect to the second feature point, based on the similarity transformation matrix; and detecting a first feature point matching with the second feature point in the match region.

As a further example, the step of detecting a first feature point matching with the second feature point in the match region, which is performed by the computer program instructions when executed by the processor, comprises: calculating, for each first feature point in the match region, an Euclidean distance between the second descriptor of the second feature point and a first descriptor of the first feature point; determining a relationship between a ratio between the smallest Euclidean distance and the second smallest Euclidean distance, and a third preset threshold; and if the ratio between the smallest Euclidean distance and the second smallest Euclidean distance is smaller than the third preset threshold, the second feature point and the first feature point with the smallest Euclidean distance to the second descriptor of the second feature point in the match region are determined as the matched feature point pair.

As a further example, the computer program instructions, when executed by the processor, further perform steps of acquiring the registered image; detecting a set of second feature points representing detail features of the registered image, in the registered image; extracting, for each second feature point in the set of second feature points, a second descriptor describing feature information on the second feature point; and storing the second descriptor.

As a further example, the step of calculating the number of the matched feature point pairs, which is performed by the computer program instructions when executed by the processor, comprises: obtaining a preliminary match result of the matched feature point pairs between the set of first feature points and the set of second feature points, based on the first descriptor and the second descriptor; and screening the preliminary match result based on the RANSAC method, to obtain the matched feature point pairs.

In addition, according to an embodiment of the present disclosure, a computer program product is further provided. The computer program produce according to the embodiment of the present disclosure includes a computer readable medium having stored thereon computer program instructions.

The computer program instructions, when executed by the computer, may realize respective function modules in the face recognition apparatus according to the embodiment of the present disclosure, and/or performs the face recognition system according to the embodiment of the present disclosure.

For example, the computer program instructions, when executed by the processor, perform the following steps: acquiring an image to be recognized, for the face; detecting a set of first feature points representing detail features of the image to be recognized, in the image to be recognized; extracting, for each first feature point in the set of first feature points, a first descriptor describing feature information on the first feature point; acquiring, for each second feature point in a set of second feature points, a second descriptor describing feature information on the second feature point, the set of second feature points representing detail features of a pre-stored registered image; detecting matched feature point pairs between the set of first feature points and the set of second feature points, based on the first descriptor and the second descriptor; calculating the number of the matched feature point pairs; and recognizing the image to be recognized as being consistent with the registered image, if the number of the matched feature point pairs is larger than a first preset threshold.

The respective modules in the face recognition apparatus according to the embodiment of the present disclosure may be realized by at least one processor in the face recognition system according to the embodiment of the present disclosure executing computer program instructions stored in at least one memory, or may be realized by the computer instructions, which are stored in the computer readable storage medium of the computer program product according to the embodiment of the present disclosure, executed by the computer.

The computer readable storage medium may be any combination of one or more computer readable storage medium. For example, one computer readable storage medium includes program code for generating action instruction sequence randomly and another computer readable storage medium includes program code for performing face recognition.

The computer readable storage medium may include, for example, a memory card of a smart phone, a storage of a tablet, a hard disk of a personal computer, a Random Access Memory (RAM), a Read-only Memory (ROM), an Erasable Programmable Read-Only Memory (EPROM), a Compact-Disk Read-Only Memory (CD-ROM), a USB memory, or any combination of the above storage medium.

The exemplary embodiments of the present disclosure described above in detail are only illustrative but not limiting. Those skilled in the art should understand that various modifications, combinations or sub-combinations may be made without departing from the scope and the spirit of the present disclosure, and such modifications, combinations or sub-combinations shall fall within the protection scope of the present disclosure.

What is claimed is:

1. A method for recognizing a face, comprising:
    acquiring an image to be recognized, for the face;
    detecting a set of first feature points representing detail features of the image to be recognized, in the image to be recognized;
    extracting, for each first feature point in the set of first feature points, a first descriptor describing feature information on the first feature point;
    acquiring, for each second feature point in a set of second feature points, a second descriptor describing feature information on the second feature point, the set of second feature points representing detail features of a pre-stored registered image;
    detecting matched feature point pairs between the set of first feature points and the set of second feature points, based on the first descriptor and the second descriptor;
    calculating the number of the matched feature point pairs; and
    recognizing the image to be recognized as being consistent with the registered image, if the number of the matched feature point pairs is larger than a first preset threshold,
    wherein detecting matched feature point pairs between the set of first feature points and the set of second feature points comprises:

calculating a similarity transformation matrix between the image to be recognized and the registered image based on a set of first key points representing structure information on the image to be recognized and a set of second key points representing structure information on the registered image;

calculating, for each first feature point, a first match region in the registered image with respect to the first feature point based on the similarity transformation matrix;

calculating, for each second feature point in the first match region, a Euclidean distance between the first descriptor of the first feature point and the second descriptor of the second feature point;

determining a relationship between a ratio between a smallest Euclidean distance and a second smallest Euclidean distance, and a third preset threshold; and determining the first feature point and the second feature point with the smallest Euclidean distance to the first descriptor of the first feature point in the first match region as the matched feature point pair if the ratio between the smallest Euclidean distance and the second smallest Euclidean distance is smaller than the third preset threshold;

or detecting matched feature point pairs between the set of first feature points and the set of second feature points comprises:

calculating a similarity transformation matrix between the image to be recognized and the registered image based on the set of first key points and the set of second key points;

calculating, for each second feature point, a second match region in the image to be recognized with respect to the second feature point based on the similarity transformation matrix; and calculating, for each first feature point in the second match region, a Euclidean distance between the second descriptor of the second feature point and the first descriptor of the first feature point;

determining a relationship between a ratio between a smallest Euclidean distance and a second smallest Euclidean distance, and a third preset threshold; and determining the second feature point and the first feature point with the smallest Euclidean distance to the second descriptor of the second feature point in the second match region as the matched feature point pair if the ratio between the smallest Euclidean distance and the second smallest Euclidean distance is smaller than the third preset threshold.

2. The method of claim 1, wherein a resolution of the image is larger than a preset resolution threshold.

3. The method of claim 1, further comprising:
detecting a face region image in the image to be recognized;
wherein, detecting the set of first feature points representing detail features of the image to be recognized in the image to be recognized comprises:
detecting the set of first feature points based on the face region image.

4. The method of claim 3, wherein detecting the set of first feature points comprises:
scaling the face region image into different scales; and
detecting a location and a size of the first feature point using an off-line trained feature point classifier, for the face region image in each scale.

5. The method of claim 3, wherein detecting the set of first feature points comprises:
performing a convolution process on the face region image with Gaussian cores in different scales, to obtain corresponding Gaussian images in different scales;
performing a differentiating process on the Gaussian images in adjacent scales to obtain Gaussian differentiating images;
determining an extreme point in each Gaussian differentiating image, wherein a value of the extreme point is larger than values of adjacent points in the Gaussian differentiating image and is larger than values of adjacent points in the Gaussian differentiating images in adjacent scales; and
determining an extreme point as the first feature point if the value of the extreme point is larger than a second preset threshold.

6. The method of claim 1, wherein extracting, for each first feature point in the set of first feature points, a first descriptor describing feature information on the first feature point comprises:
performing a normalization process on each first feature point, with the first feature point as a preset reference, to obtain a feature point region image; and
acquiring the first descriptor of the first feature point using an off-line trained descriptor extractor, for the feature point region image.

7. The method of claim 1, wherein extracting, for each first feature point in the set of first feature points, the first descriptor describing feature information on the first feature point, comprises:
determining, for each first feature point, a feature point region with the first feature point as a preset reference;
dividing the feature point region into multiple sub regions and calculating gradient information on each sub region;
calculating a multiple dimensional gradient histogram of each sub region based on the gradient information; and
connecting the number of points in each dimension of the multiple dimensional gradient histogram as a feature vector, to obtain the first descriptor of the first feature point.

8. The method of claim 1, further comprising:
detecting the set of first key points.

9. The method of claim 1, wherein the second descriptor is obtained by:
acquiring the registered image;
detecting the set of second feature points representing detail features of the registered image, in the registered image;
extracting, for each second feature point in the set of second feature points, a second descriptor describing the feature information on the second feature point; and
storing the second descriptor.

10. The method of claim 1, wherein calculating the number of the matched feature point pairs comprises:
obtaining a preliminary match result of the matched feature point pairs between the set of first feature points and the set of second feature points, based on the first descriptor and the second descriptor; and
screening the preliminary match result based on a Random Sample Consensus method, to obtain the matched feature point pairs.

11. A system for recognizing a face, comprising:
a processor;
a memory;
computer program instructions stored in the memory, which, when executed by the processor, perform steps of:

acquiring an image to be recognized, for the face;

detecting a set of first feature points representing detail features of the image to be recognized, in the image to be recognized;

extracting, for each first feature point in the set of first feature points, a first descriptor describing feature information on the first feature point;

acquiring, for each second feature point in a set of second feature points, a second descriptor describing feature information on the second feature point, the set of second feature points representing detail features of a pre-stored registered image;

detecting matched feature point pairs between the set of first feature points and the set of second feature points, based on the first descriptor and the second descriptor;

calculating the number of the matched feature point pairs; and recognizing the image to be recognized as being consistent with the registered image, if the number of the matched feature point pairs is larger than a first preset threshold, wherein detecting matched feature point pairs between the set of first feature points and the set of second feature points which is performed by the computer program instructions when executed by the processor, comprises:

calculating a similarity transformation matrix between the image to be recognized and the registered image based on a set of first key points representing structure information on the image to be recognized and a set of second key points representing structure information on the registered image;

calculating, for each first feature point, a first match region in the registered image with respect to the first feature point based on the similarity transformation matrix;

calculating, for each second feature point in the first match region, a Euclidean distance between the first descriptor of the first feature point and the second descriptor of the second feature point;

determining a relationship between a ratio between a smallest Euclidean distance and a second smallest Euclidean distance, and a third preset threshold; and determining the first feature point and the second feature point with the smallest Euclidean distance to the first descriptor of the first feature point in the first match region as the matched feature point pair, if the ratio between the smallest Euclidean distance and the second smallest Euclidean distance is smaller than the third preset threshold;

or detecting matched feature point pairs between the set of first feature points and the set of second feature points, which is performed by the computer program instructions when executed by the processor, comprises:

calculating a similarity transformation matrix between the image to be recognized and the registered image based on the set of the first key points and the set of second key points;

calculating, for each second feature point, a second match region in the image to be recognized with respect to the second feature point, based on the similarity transformation matrix;

calculating, for each first feature point in the second match region, a Euclidean distance between the second descriptor of the second feature point and the first descriptor of the first feature point;

determining a relationship between a ratio between a smallest Euclidean distance and a second smallest Euclidean distance, and a third preset threshold; and determining the second feature point and the first feature point with the smallest Euclidean distance to the second descriptor of the second feature point in the second match region as the matched feature point pair if the ratio between the smallest Euclidean distance and the second smallest Euclidean distance is smaller than the third preset threshold.

12. The system of claim 11, wherein, the computer program instructions, when executed by the processor, further perform steps of:

detecting a face region image in the image to be recognized;

and wherein, the step of detecting the set of first feature points in the image to be recognized, which is performed by the computer program instructions when executed by the processor, further comprises:

detecting the set of first feature points based on the face region image.

13. The system of claim 12, wherein the step of detecting the set of first feature points, which is performed by the computer program instructions when executed by the processor, comprises:

scaling the face region image into different scales; and detecting a location and a size of the first feature point using an off-line trained feature point classifier, for the face region image in each scale.

14. The system of claim 12, wherein the step of detecting the set of first feature points, which is performed by the computer program instructions when executed by the processor, comprises:

performing a convolution process on the face region image with Gaussian cores in different scales, to obtain corresponding Gaussian images in different scales;

performing a differentiating process on the Gaussian images in adjacent scales to obtain Gaussian differentiating images;

determining an extreme point in each Gaussian differentiating image, wherein a value of the extreme point is larger than values of adjacent points in the Gaussian differentiating image and is larger than values of adjacent points in the Gaussian differentiating images in adjacent scales; and determining an extreme point as the first feature point if the value of the extreme point is larger than a second preset threshold.

15. The system of claim 11, wherein the step of extracting the first descriptor which is performed by the computer program instructions when executed by the processor, comprises:

performing a normalization process on each first feature point, with the first feature point as a preset reference, to obtain a feature point region image; and acquiring the first descriptor of the first feature point using an off-line trained descriptor extractor, for the feature point region image.

16. The system of claim 11, wherein the step of extracting the first descriptor, which is performed by the computer program instructions when executed by the processor, comprises:
- determining, for each first feature point, a feature point region with the first feature point as a preset reference;
- dividing the feature point region into multiple sub regions and calculating gradient information on each sub region;
- calculating a multiple dimensional gradient histogram of each sub region based on the gradient information; and
- connecting the number of points in each dimension of the multiple dimensional gradient histogram as a feature vector, to obtain the first descriptor of the first feature point.

17. The system of claim 11, the computer program instructions, when executed by the processor, further perform steps of:
- detecting the set of first key points.

18. The system of claim 11, wherein the computer program instructions, when executed by the processor, further perform steps of:
- acquiring the registered image;
- detecting the set of second feature points representing detail features of the registered image, in the registered image;
- extracting, for each second feature point in the set of second feature points, a second descriptor describing feature information on the second feature point; and
- storing the second descriptor.

19. The system of claim 11, wherein the step of calculating the number of the matched feature point pairs, which is performed by the computer program instruction when executed by the processor, comprises:
- obtaining a preliminary match result of the matched feature point pairs between the set of first feature points and the set of second feature points, based on the first descriptor and the second descriptor; and
- screening the preliminary match result based on a Random Sample Consensus method, to obtain the matched feature point pairs.

20. A computer program product comprising a non-transitory computer readable storage medium having stored thereon computer program instructions, which, when executed by a computer, perform steps of:
- acquiring an image to be recognized, for the face;
- detecting a set of first feature points representing detail features of the image to be recognized, in the image to be recognized;
- extracting, for each first feature point in the set of first feature points, a first descriptor describing feature information on the first feature point;
- acquiring, for each second feature point in a set of second feature points, a second descriptor describing feature information on the second feature point, the set of second feature points representing detail features of a pre-stored registered image;
- detecting matched feature point pairs between the set of first feature points and the set of second feature points, based on the first descriptor and the second descriptor;
- calculating the number of the matched feature point pairs; and
- recognizing the image to be recognized as being consistent with the registered image, if the number of the matched feature point pairs is larger than a first preset threshold, wherein detecting matched feature point pairs between the set of first feature points and the set of second feature points comprises:
- calculating a similarity transformation matrix between the image to be recognized and the registered image based on a set of first key points representing structure information on the image to be recognized and a set of second key points representing structure information on the registered image;
- calculating, for each first feature point, a first match region in the registered image with respect to the first feature point based on the similarity transformation matrix;
- calculating, for each second feature point in the first match region, a Euclidean distance between the first descriptor of the first feature point and the second descriptor of the second feature point;
- determining a relationship between a ratio between a smallest Euclidean distance and a second smallest Euclidean distance, and a third preset threshold; and
- determining the first feature point and the second feature point with the smallest Euclidean distance to the first descriptor of the first feature point in the first match region as the matched feature point pair if the ratio between the smallest Euclidean distance and the second smallest Euclidean distance is smaller than the third preset threshold;

or detecting matched feature point pairs between the set of first feature points and the set of second feature points comprises:
- calculating a similarity transformation matrix between the image to be recognized and the registered image based on the set of first key points and the set of second key points;
- calculating, for each second feature point, a second match region in the image to be recognized with respect to the second feature point based on the similarity transformation matrix;
- calculating, for each first feature point in the match region, a Euclidean distance between the second descriptor of the second feature point and the first descriptor of the first feature point;
- determining a relationship between a ratio between a smallest Euclidean distance and a second smallest Euclidean distance, and a third preset threshold; and
- determining the second feature point and the first feature point with the smallest Euclidean distance to the second descriptor of the second feature point in the second match region as the matched feature point pair if the ratio between the smallest Euclidean distance and the second smallest Euclidean distance is smaller than the third preset threshold.

* * * * *